US008868329B2

(12) United States Patent
Ikeda et al.

(10) Patent No.: US 8,868,329 B2
(45) Date of Patent: Oct. 21, 2014

(54) PARKING POSITION ADJUSTMENT DEVICE (75) Inventors: Keigo Ikeda, Anjo (JP); Yu Tanaka, Nagoya (JP); Jun Kadowaki, Kariya (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/821,351

(22) PCT Filed: Oct. 5, 2011

(86) PCT No.: PCT/JP2011/072946
§ 371 (c)(1),
(2), (4) Date: Mar. 7, 2013

(87) PCT Pub. No.: WO2012/073592
PCT Pub. Date: Jun. 7, 2012

(65) Prior Publication Data
US 2013/0166190 A1    Jun. 27, 2013

(30) Foreign Application Priority Data

Nov. 30, 2010  (JP) ................. 2010-266751

(51) Int. Cl.
| G01C 21/00 | (2006.01) |
| G01M 17/00 | (2006.01) |
| G06F 19/00 | (2011.01) |
| G06F 7/00 | (2006.01) |
| B60R 1/00 | (2006.01) |
| B62D 15/02 | (2006.01) |

(52) U.S. Cl.
CPC . *G01C 21/00* (2013.01); *B60R 1/00* (2013.01); *B62D 15/0285* (2013.01); *B60R 2300/806* (2013.01)
USPC ........................................ 701/400; 701/33.4

(58) Field of Classification Search
CPC ............... B62D 15/027; B62D 15/025; B62D 15/0285; B60T 2201/10
USPC ................................................. 701/400, 33.4
See application file for complete search history.

(56) References Cited

U.S. PATENT DOCUMENTS 7,161,616 B1    1/2007  Okamoto et al.
2004/0249564 A1*  12/2004  Iwakiri et al. ................. 701/200
(Continued)

FOREIGN PATENT DOCUMENTS

| JP | 3300334 B2 | 7/2002 |
| JP | 2006-027334 A | 2/2006 |

(Continued)

OTHER PUBLICATIONS

Japanese Office Action, dated Dec. 5, 2013, issued in corresponding Japanese Patent Application No. 2010-266751.

(Continued)

*Primary Examiner* — Imran Mustafa
(74) *Attorney, Agent, or Firm* — Sughrue Mion, PLLC (57) ABSTRACT

A parking position adjustment device that assists in correctly changing a parking position within a parking space in which a vehicle has already parked is provided.
The parking position adjustment device includes: a current position setting unit that sets the position in which a vehicle is already parked as a current position; a parking space specification unit that specifies a parking space, in which the vehicle is parked, that includes the current position; a target parking position setting unit that sets, within the parking space, a target parking position to which the vehicle is to be moved from the current position; and a movement path calculation unit that calculates a movement path of the vehicle from the current position to the target parking position.

11 Claims, 7 Drawing Sheets

(56) References Cited

U.S. PATENT DOCUMENTS

2009/0174574 A1* 7/2009 Endo et al. .................. 340/932.2
2011/0261201 A1 10/2011 Fujii et al.

FOREIGN PATENT DOCUMENTS

| | | |
|---|---|---|
| JP | 2006-088827 A | 4/2006 |
| JP | 2006-321291 A | 11/2006 |
| JP | 2008-126940 A | 6/2008 |
| JP | 2008-213516 A | 9/2008 |
| JP | 2009-096347 A | 5/2009 |
| JP | 2010-128619 A | 6/2010 |

OTHER PUBLICATIONS

English Translation of International Preliminary Report on Patentability for PCT/JP2011/072946 dated Jun. 13, 2013.

* cited by examiner

CORRECTION AMOUNT INPUT SCREEN (a)

PARKING ASSIST SCREEN (b)

POST-ASSIST DISPLAY SCREEN

CORRECTION AMOUNT INPUT SCREEN (a)

PARKING ASSIST SCREEN (b)

POST-ASSIST DISPLAY SCREEN (c)

PARKING POSITION ADJUSTMENT DEVICE

CROSS REFERENCE TO RELATED APPLICATIONS

This application is a National Stage of International Application No. PCT/JP2011/072946, filed on Oct. 5, 2011, which claims priority from Japanese Patent Application No. 2010-266751, filed Nov. 30, 2010, the contents of all of which are incorporated herein by reference in their entirety.

TECHNICAL FIELD

The present invention relates to parking position adjustment devices that adjust the position of a vehicle that has already been parked in a parking space.

BACKGROUND ART

When parking a vehicle in a parking space, there are cases where it is not possible to park in the center of the parking space on a single try without changing directions depending on the spacing of the parking spaces, the width of the road connected to the parking spaces, and so on. There are also situations where, for example, a following vehicle is present, which can cause a driver to rush and thus be unable to correctly park in the center of the parking space. Furthermore, there are cases where a vehicle (the host vehicle) has been parked in a parking space but a vehicle (another vehicle) parked in a parking space adjacent thereto (an adjacent parking space) has been parked off-center toward the host vehicle. In such a case, the occupants of the vehicle (the host vehicle) do not have sufficient space to enter/exit from the vehicle, and there are the situations where it is preferable to correct the position of the vehicle (the host vehicle) parked within the parking space. There are techniques that can be used in such cases (for example, Patent Documents 1 and 2).

A monitoring system disclosed in Patent Document 1 generates a bird's-eye view image seen from a virtual origin based on images captured by a plurality of cameras. Through this, an occupant can understand the conditions in the periphery of his or her vehicle (that is, positional relationships between adjacent vehicles, objects present in the periphery, and so on, and the vehicle). Meanwhile, a drive assist apparatus disclosed in Patent Document 2 generates a bird's-eye view image including a vehicle, based on video obtained by capturing the periphery of the vehicle. Guide lines that follow adjacent vehicles and objects present in the periphery, guide lines indicating a target parking position, and so on are superimposed over the bird's-eye view image.

PRIOR ART DOCUMENTS

Patent Documents

Patent Document 1: JP 3300334B
Patent Document 2: JP 2006-27334A

DISCLOSURE OF THE INVENTION

Problem to be Solved by the Invention

As described above, using the techniques disclosed in Patent Documents 1 and 2 makes it possible to park a vehicle (a host vehicle) correctly in a parking space. However, no considerations are made as to adjusting, within a parking space, the position of a vehicle (a host vehicle) that is already parked in that parking space. When making such adjustments, it is necessary for a user to consider the path of travel when adjusting the position of the host vehicle, taking the position of the host vehicle within the parking space and the positional relationships between the host vehicle and objects (including other vehicles) present in the periphery of the host vehicle into consideration. There have thus been problems in that the driver is required to pay close attention to the periphery of the host vehicle, increasing his or her mental fatigue, and drivers who, for example, feel unsure about their parking skills cannot necessarily obtain satisfying results.

Having been achieved in light of the stated problems, it is an object of the present invention to provide a parking position adjustment device that assists in adjusting the parking position of a host vehicle performed within a parking space in which the host vehicle is already parked.

Means for Solving Problem

A characteristic configuration of a parking position adjustment device according to the present invention for achieving the aforementioned object includes: a current position setting unit that sets the position in which a vehicle is already parked as a current position; a parking space specification unit that specifies a parking space, in which the vehicle is parked, that includes the current position; a target parking position setting unit that sets, within the parking space, a target parking position to which the vehicle is to be moved from the current position; and a movement path calculation unit that calculates a movement path of the vehicle from the current position to the target parking position.

According to this characteristic configuration, a parking space including the current position of the host vehicle is specified and the target parking position is then set within the specified parking space, which makes it possible to accurately set the target parking position. In addition, the movement path is comparatively short, and thus the processing load involved in calculating the movement path can be lightened. Accordingly, a high-performance computational processing unit is unnecessary, which makes it possible to realize a low-cost parking position adjustment device. Furthermore, an occupant of the vehicle may simply move the vehicle along the movement path that has been calculated and found in this manner, which makes it possible to easily adjust the parking position of the host vehicle within a parking space in which the vehicle has already been parked. Further still, according to this characteristic configuration, in the case where, for example, a following vehicle has approached the host vehicle from the rear in a parking lot, the driver of the host vehicle can temporarily park in a parking space through his/her own driving operations and then re-park the vehicle in a desired position quickly and correctly. This makes it possible to lighten the psychological burden on the driver without making the following vehicle wait.

Meanwhile, it is preferable for the target parking position setting unit to be configured so as to input a correction amount from the current position of the vehicle to the target parking position.

According to this configuration, the target parking position can be correctly set within the parking space in accordance with the inputted correction amount.

In addition, it is preferable for the vehicle to include a display unit that displays conditions in the periphery of the vehicle.

According to this configuration, an occupant can easily be aware of the periphery of the vehicle. Accordingly, the correction amount can be inputted having taken into consideration the conditions in the periphery of the vehicle.

In addition, it is preferable for the display unit to display a bird's-eye view image including the periphery of the vehicle.

According to this configuration, a bird's-eye view image of the periphery of the vehicle is displayed, and thus it is easy to visually recognize the distance from the vehicle to an object present in the periphery of the vehicle. This makes it possible to input the correction amount so as to avoid the object present in the periphery.

In addition, it is preferable for the correction amount to be inputted by moving a vehicle image displayed in the display unit.

According to this configuration, the inputted correction amount is displayed in a visual manner, and thus the correction amount can be correctly inputted.

In addition, it is preferable for a vehicle image indicating the current position to also be displayed in the display unit.

According to this configuration, the correction amount can be inputted while referring to the current position of the vehicle. Accordingly, the correction amount can be correctly identified as being valid or invalid.

In addition, it is preferable for the parking position adjustment device to further include sonar that detects an object in the periphery of the vehicle, and for the target parking position setting unit to set an allowable input range for the correction amount based on the distance from the vehicle to an object detected by the sonar.

According to this configuration, the input of the correction amount is restricted based on the sonar detection result even in the case where an occupant of the vehicle in unaware of an object present in the periphery of the vehicle; this makes it possible to prevent unnecessary calculations of the target parking position, the movement path, and so on. Furthermore, restricting the input of the correction amount makes it possible to make the occupant of the vehicle aware that an object is present in the periphery of the vehicle.

In addition, it is preferable for the parking position adjustment device to further include a camera that obtains a peripheral image by capturing an image of conditions in the periphery of the vehicle, and for the target parking position setting unit to set an allowable input range for the correction amount based on the distance from the vehicle to an object included in the peripheral image.

According to this configuration, the input of the correction amount is restricted based on a peripheral image captured and obtained by the camera even in the case where an occupant of the vehicle in unaware of an object present in the periphery of the vehicle; this makes it possible to prevent unnecessary calculations of the target parking position, the movement path, and so on. Furthermore, restricting the input of the correction amount makes it possible to make the occupant of the vehicle aware that an object is present in the periphery of the vehicle.

In addition, it is preferable for the object to be a vehicle parked in the periphery of the vehicle.

According to this configuration, other vehicles parked in the periphery of the host vehicle can be brought to an occupant's attention. Accordingly, the host vehicle can be prevented from coming too close to another vehicle, even when moving within a parking space; it is thus possible to avoid damaging the other vehicle when, for example, opening a door.

In addition, it is preferable for the object to be a dividing line that defines the parking space.

According to this configuration, the parking space in which the host vehicle has been parked can be specified with ease.

Accordingly, the dividing line can be used as a reference, which makes it possible to correctly calculate the movement path so that the host vehicle does not protrude from the sides of the parking space in which the host vehicle is parked.

In addition, it is preferable for the target parking position setting unit to set an allowable input range for the correction amount based on the distance from the vehicle to the object and an entry/exit space for an occupant of the vehicle.

According to this configuration, a space for the occupant of the vehicle to enter/exit can be secured, which makes it possible for the occupant to smoothly enter/exit even in the case where the position of the vehicle has been adjusted. Furthermore, even if another vehicle is parked in the periphery of the vehicle, it is possible to avoid damaging the other vehicle with the opened door or the like.

In addition, it is preferable for the parking position adjustment device to further include: a periphery information obtainment unit that obtains periphery information indicating conditions in the periphery of the vehicle; a correction amount calculation unit that calculates the correction amount based on the periphery information and an entry/exit space for an occupant of the vehicle.

According to this configuration, the correction amount input can be carried out automatically, eliminating the need for an occupant to input the correction amount. Accordingly, this avoids burdening the occupant with the correction amount input. In addition, the correction amount is calculated based on the periphery information and the entry/exit space for an occupant of the vehicle, making it possible to correctly secure an entry/exit space for the occupant. This makes it possible for the occupant to smoothly enter/exit from the vehicle. Furthermore, even if another vehicle is parked in the periphery of the vehicle, it is possible to avoid damaging the other vehicle with the opened door or the like.

In addition, it is preferable for parameters defining rotation to be included in parameters that define the current position and the target parking position.

According to this configuration, it is possible to correctly adjust the parking position in the case where the host vehicle is slanted relative to the parking space. In addition, it is possible to correctly adjust the parking position even in the case where the angle is simply different between the current position and the target parking position.

In addition, it is preferable for the movement path to be a path along which the vehicle moves, including forward travel, reverse travel, and steering operations.

According to this configuration, the movement path can be set with ease.

BEST MODE FOR CARRYING OUT THE INVENTION

1. First Embodiment

Figure 1:
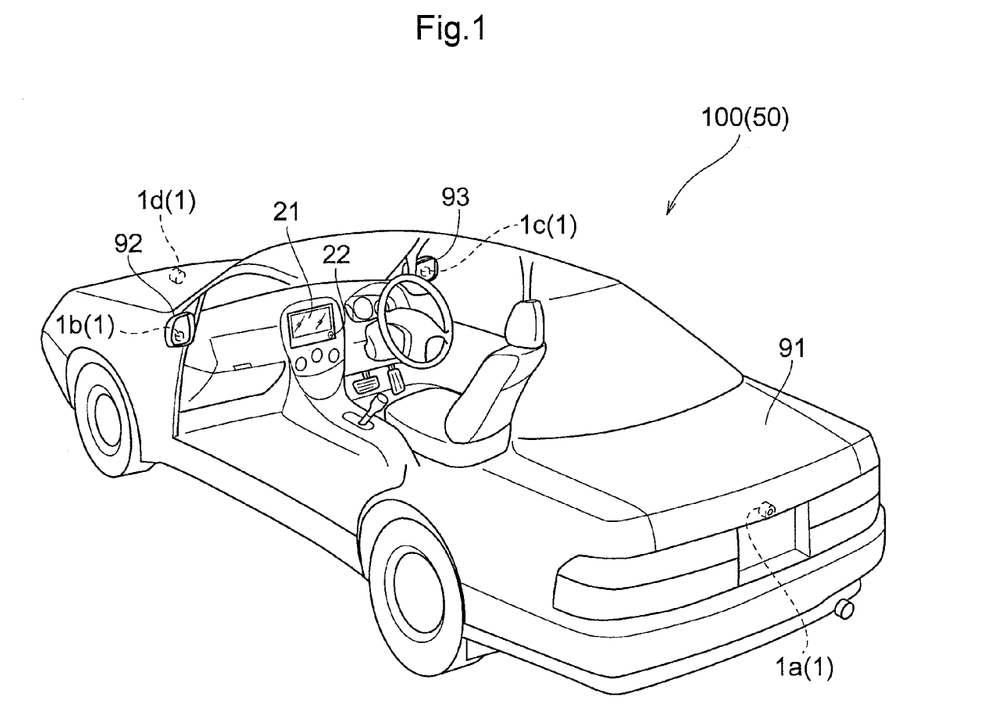
FIG. 1 is a perspective view illustrating an overview of a vehicle provided with a parking position adjustment device.

Hereinafter, embodiments of the present invention will be described in detail. FIG. 1 is a perspective view illustrating an overview of a vehicle 100 provided with a parking position adjustment device 50 according to the present invention. A rear camera 1a is provided on a rear area of the vehicle 100 (in the present example, on a trunk door 91). A left side camera 1b is provided on a lower area of a left side mirror 92 on a left-front door, whereas a right side camera 1c is provided on a lower area of a right side mirror 93 on a right-front door. Furthermore, a forward camera 1d is provided on a front area of the vehicle. In the following descriptions, the cameras 1a through 1d will be collectively referred to as "cameras 1" (vehicle-mounted cameras) where appropriate.

The cameras 1 are digital cameras that employ image sensors such as CCDs (charge coupled devices) or CISs (CMOS image sensors), capture two-dimensional images in time series at 15-30 frames per second, convert the images into digital images, and output the captured images in real time. The cameras 1 are configured with wide-angle lenses. Specifically, in the present embodiment, a view angle of 140-190° in the horizontal direction is provided. The rear camera 1a and the forward camera 1d are disposed on the vehicle 100 having an angle of depression of approximately 30 degrees in the optical axis, and are thus capable of capturing a region up to approximately 8 m from the vehicle 100. The left side camera 1b and the right side camera 1c are disposed on the base areas of the side mirrors 92 and 93 with their optical axes facing downward or at a downward angle facing out from the vehicle, and take part of the side surface of the vehicle and the road surface (ground surface) as their subjects. During parking position adjustment, which will be mentioned later, images captured by the cameras 1, images related to the parking position adjustment generated using the captured images, and so on are displayed in a monitor 21. Meanwhile, audio guidance based on the parking position adjustment is emitted from a speaker 22. It is possible to make operational inputs related to the parking position adjustment via the monitor 21, which also functions as a touch panel. Note that in the present embodiment, the monitor 21 corresponds to a "display unit" according to the present invention.

1-1. Configuration of Parking Position Adjustment Device

Figure 2:
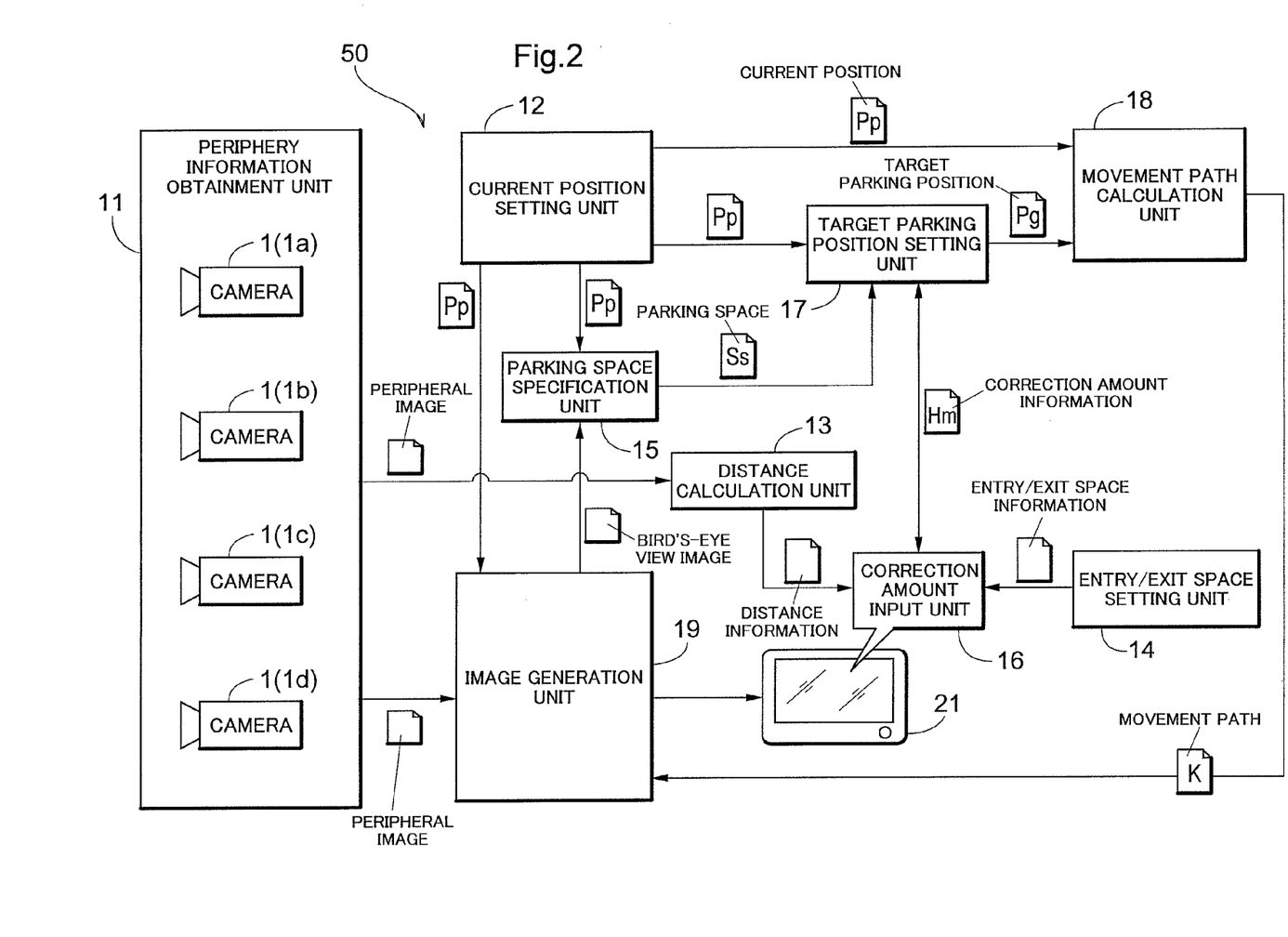
FIG. 2 is a block diagram schematically illustrating the overall configuration of a parking position adjustment device according to a first embodiment.

The parking position adjustment device 50 according to the present invention has a function for generating a path to be traveled on when adjusting the position of the vehicle 100 that has already been parked in a parking space, using images (captured images) of the periphery of the vehicle 100 obtained by the cameras 1 provided in the vehicle 100 as described above. FIG. 2 is a block diagram schematically illustrating the overall configuration of this parking position adjustment device 50.

The parking position adjustment device 50 according to the present embodiment is configured so as to include the following functional units: a periphery information obtainment unit 11; a current position setting unit 12; a distance calculation unit 13; an entry/exit space setting unit 14; a parking space specification unit 15; a correction amount input unit 16; a target parking position setting unit 17; a movement path calculation unit 18; an image generation unit 19; and the monitor 21. In this parking position adjustment device 50, the functional units for performing various types of computational processes related to parking position adjustment are constructed of hardware, software, or both, with a CPU serving as a core element.

The periphery information obtainment unit 11 obtains periphery information indicating conditions in the periphery of the vehicle 100. It is possible that an object is present in the periphery of the vehicle 100. Another vehicle parked in the periphery of the vehicle 100, a person, an obstruction, dividing lines indicating parking spaces, and so on can be given as examples of such an object. The periphery information obtainment unit 11 can be configured of the aforementioned cameras 1. In this case, the periphery information corresponds to an image of the periphery of the vehicle 100 (a peripheral image) captured by the cameras 1. This peripheral image is sent to the distance calculation unit 13 and the image generation unit 19, which will be mentioned later, as the periphery information.

The current position setting unit 12 sets the position in which the vehicle 100 is already parked as a current position. The position of the vehicle 100 is set as the current position once the vehicle 100 is parked in a predetermined position and at the point in time when, for example, an occupant of the vehicle 100 commences processing performed by the parking position adjustment device 50 with the intent of adjusting the parking position using the parking position adjustment device 50. This "point of time when an occupant commences processing" can be specified by, for example, a "start" switch being pressed. The current position setting unit 12 sets the position as the current position in this manner. The current position is sent to the parking space specification unit 15, the target parking position setting unit 17, the movement path calculation unit 18, and the image generation unit 19, mentioned later, as current position information.

The distance calculation unit 13 calculates a distance from the vehicle 100 to an object included in the peripheral image based on the peripheral image sent from the periphery information obtainment unit 11. The peripheral image is, as described above, sent as the periphery information. The object included in the peripheral image corresponds to another vehicle parked adjacent to the vehicle 100, dividing lines or curb stones that separate parking spaces, or the like. Such objects can be detected by analyzing the peripheral image (performing image recognition). Such analysis may be performed by the distance calculation unit 13, or may be performed by an image recognition unit, not shown here. The distance calculation unit 13 calculates a distance between an object obtained by analyzing the peripheral image in this manner and the vehicle 100. This calculation can be carried out using a known technique, and thus details thereof will be omitted here. The distance obtained by the calculation performed by the distance calculation unit 13 is sent to the correction amount input unit 16, which will be mentioned later, as distance information.

The entry/exit space setting unit 14 sets a space for an occupant of the vehicle 100 to enter/exit the vehicle 100. In the example shown in FIG. 1, the space for the occupant to enter/exit (an entry/exit space) corresponds to the amount of space required to, for example, open a hinged door in order for an occupant of the vehicle 100 to enter the vehicle 100 or exit from the vehicle 100. This space is set to, for example, approximately 70 cm. Of course, the space is not limited to 70 cm, and can be set to a different value. Meanwhile, in the case where the vehicle 100 includes a sliding door and an occupant of the vehicle 100 enters the vehicle 100 and exits from the vehicle 100 through the sliding door, the stated space is set to, for example, approximately 50 cm. Of course, this value can be set to a different value. Furthermore, these settings may be configured in advance as specified values, and a configuration in which a user sets the values as necessary is also possible. The entry/exit space set in this manner is sent to the correction amount input unit 16, which will be mentioned later, as entry/exit space information.

The parking space specification unit 15 specifies a parking space, containing the current position, in which the vehicle 100 has been parked. The current position is the position in which the vehicle 100 is parked, set by the current position setting unit 12. The parking space is a space defined in advance as a space for parking a vehicle. Accordingly, in the present embodiment, a space that is not designed to be a parking space (for example, a road) does not correspond to the parking space. The parking space according to the present embodiment particularly refers to a space in which a single vehicle can park. The parking space specification unit 15 specifies the parking space based on the periphery information obtained by the aforementioned periphery information obtainment unit 11. To be more specific, the peripheral image obtained by the periphery information obtainment unit 11 is at one point sent to the image generation unit 19, which will be mentioned later. The image generation unit 19 generates a bird's-eye view image based on the peripheral image obtained by the periphery information obtainment unit 11. This bird's-eye view image is then sent to the parking space specification unit 15. Then, in this bird's-eye view image, the parking space specification unit 15 specifies, as the parking space, a region that contains the current position of the vehicle 100 and that is segmented by the periphery information that includes dividing lines, adjacent parked vehicles, or the like contained in the peripheral image. The parking space specified by the parking space specification unit 15 is sent to the target parking position setting unit 17, which will be mentioned later, as parking space information.

Figure 3:
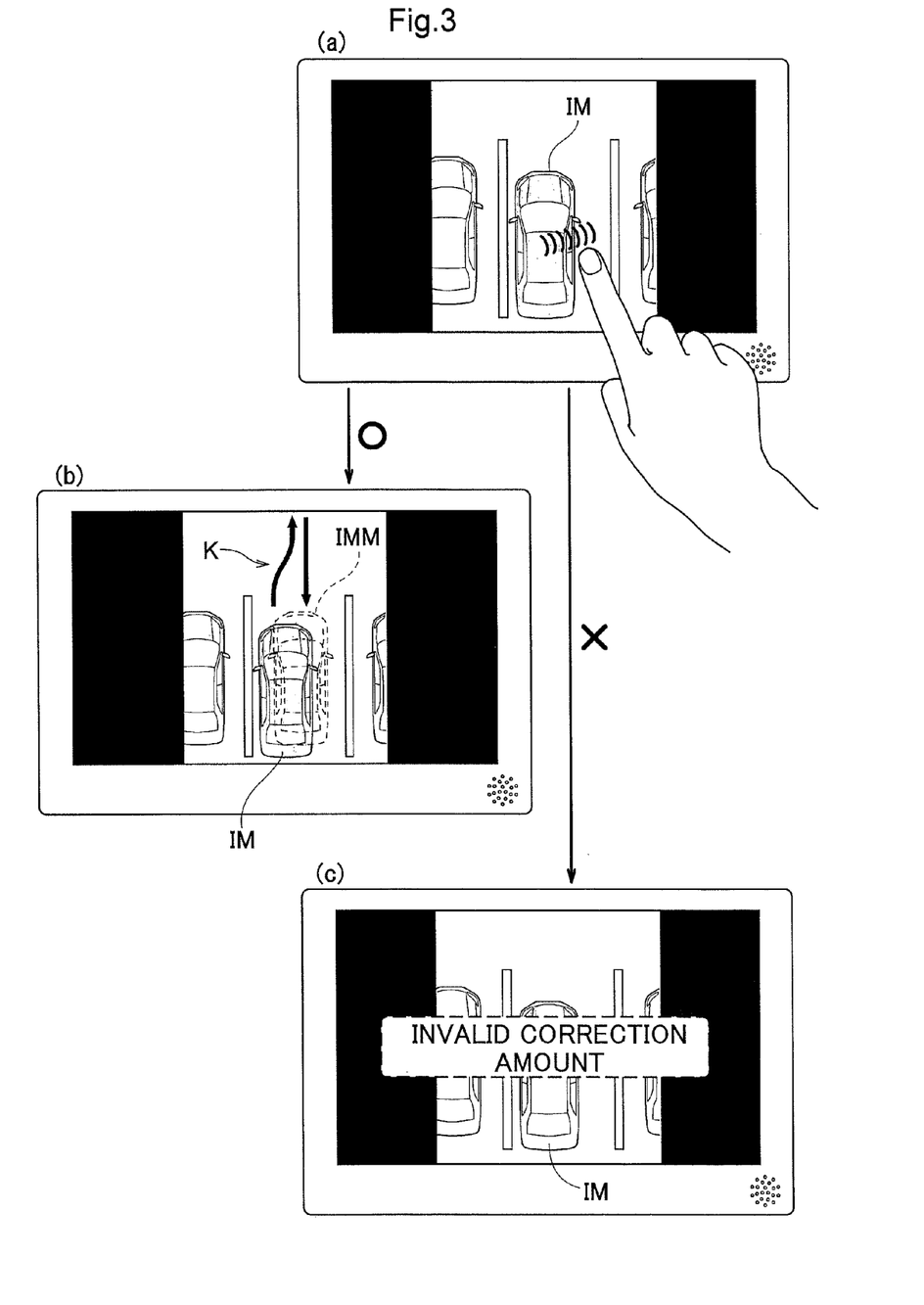
FIG. 3 is a diagram illustrating the input of a correction amount.

The correction amount input unit 16 inputs a correction amount by which the current position of the vehicle 100 is to be corrected within the parking space. The correction amount is an amount by which the current position of the vehicle 100 is to be corrected. This correction amount is defined by a distance, direction, angle, or the like required to move the vehicle 100 from the current position to a desired position. More specifically, for example, "30 cm to the right", "10 degrees in the clockwise direction", "15 cm to the rear", and so on correspond to the correction amount. In the present embodiment, this correction amount is inputted by an occupant of the vehicle 100 him/herself. This input is carried out via the monitor 21, which will be discussed later, functioning as a touch panel. More specifically, the input may be made using, for example, an "arrow" key, or a specific numerical value may be inputted. Alternatively, the vehicle can be dragged the distance by which the occupant wishes to move in the monitor 21, or in other words, the distance can be inputted by sliding the vehicle while touching the touch panel using a finger, a stylus for the touch panel, or the like, as shown in FIG. 3(*a*). The correction amount inputted by the correction amount input unit 16 is sent to the target parking position setting unit 17, which will be mentioned later, as correction amount information.

The target parking position setting unit 17 sets, within the parking space, a target parking position to which the vehicle 100 is to be moved from the current position. This setting is made in accordance with the input of the correction amount from the current position of the vehicle 100 to the target parking position. The current position of the vehicle 100 is sent from the current position setting unit 12 as the current position information. Likewise, the correction amount is sent from the correction amount input unit 16 as the correction amount information. Here, in the present embodiment, the correction amount information is defined as a vector amount including a distance and a direction (an angle). The target parking position setting unit 17 calculates and sets the target parking position relative to the current position of the vehicle 100 using the distance and direction (angle) included in the correction amount information.

Specifically, in the case where the correction amount is, for example, "30 cm to the right", a position that is "30 cm to the right" from the current position is taken as the target parking position. Likewise, in the case where the correction amount is "10 degrees in the clockwise direction", a position in which the direction the vehicle is facing has been rotated "10 degrees in the clockwise direction" is taken as the target parking position. Accordingly, particularly in the case where a correction that includes this type of rotation is to be carried out, it is preferable to include parameters that specify rotation in the parameters for specifying the current position, the target parking position, and so on. In other words, it is preferable to specify the parameters using a vector amount that includes a distance and a direction (angle), in the same manner as the aforementioned target parking position. In the case where rotation (an angle) serving as such a vector amount is defined, it is preferable to employ an angle relative to a frame that defines the parking space specified by the parking space specification unit 15.

An embodiment that corrects only the rotation (angle) rather than correcting the "position" can also be considered as a variation. That is, there are cases where there is no problem in terms of the position in which the vehicle is currently parked, but the driver wishes to change only the angle relative to the parking space in order to park the vehicle straight. In such a case, the current position, target parking position, and so on are defined as a vector amount including rotation (an angle), as described above, and can therefore be calculated as appropriate. Furthermore, in the case where the correction amount is, for example, "15 cm to the rear", a position that is "15 cm to the rear" from the current position is taken as the target parking position. The target parking position setting unit 17 calculates the target parking position in this manner. The calculated target parking position is sent to the movement path calculation unit 18, which will be discussed later, as target parking position information.

Here, the parking position adjustment device 50 adjusts (corrects) the parking position of the vehicle 100 within the parking space in which the vehicle 100 is already parked. Accordingly, if it seems that the target parking position found using the correction amount inputted via the correction amount input unit 16 will be outside of the parking space specified by the parking space specification unit 15, the target parking position setting unit 17 sends information indicating that the correction amount inputted into the correction amount input unit 16 is invalid. Through this, the correction amount input unit 16 can prompt an occupant to re-input the correction amount via the monitor 21, and is put into a standby state for the input of a valid correction amount.

Meanwhile, it is preferable for the target parking position setting unit 17 to be configured to set an allowable range for correction amount input based on the distance from the vehicle 100 to an object included in the peripheral image. The distance from the vehicle 100 to the object included in the peripheral image is calculated by the distance calculation unit 13 and sent as the distance information as described above. In the case where the inputted correction amount exceeds the distance calculated by the distance calculation unit 13, it is not physically possible to adjust (correct) the parking position of the vehicle 100. Accordingly, the target parking position setting unit 17 sets a restriction so that an occupant cannot input a value for the correction amount that is greater than the distance included in the distance information. In such a case, the configuration may be such that the input is invalidated in the case where the correction amount is greater than or equal to the stated distance, or the configuration may be such that the input of a correction amount that is greater than or equal to the distance cannot be made from the outset. Alternatively, it is also possible, in the case where a correction amount that is greater than or equal to the stated distance has been inputted, to display a message reading, for example, "invalid correction amount" in the screen, as shown in FIG. 3(c).

Furthermore, it is also possible for the target parking position setting unit 17 to be configured to set an allowable range for correction amount input based on both the distance from the vehicle 100 to an object included in the peripheral image and the occupant entry/exit space of the vehicle 100. As described above, the entry/exit space setting unit 14 sends entry/exit space information indicating the entry/exit space. In the case where the inputted correction amount exceeds a value obtained by subtracting the (width of the) entry/exit space from the aforementioned distance calculated by the distance calculation unit 13, it is possible that an occupant will be obstructed from entering/exiting. Accordingly, there is no significant merit to physically changing the parking position of the vehicle 100. For this reason, the correction amount input unit 16 sets a restriction so that a value for the correction amount that is greater than the difference between the stated distance and the (width of the) entry/exit space cannot be inputted. In such a case, the configuration may be such that the input is invalidated in the case where the correction amount is greater than or equal to the stated distance, or the configuration may be such that the input of a correction amount that is greater than or equal to the distance cannot be made from the outset. Alternatively, it is also possible, in the case where a correction amount that is greater than or equal to the stated distance has been inputted, to display a message reading, for example, "invalid correction amount" in the screen, as shown in FIG. 3(c).

The movement path calculation unit 18 calculates a movement path of the vehicle 100 from the current position to the target parking position. The current position is sent from the current position setting unit 12 as the current position information. The target parking position is sent from the target parking position setting unit 17 as the target parking position information. The movement path is a path along which the vehicle 100 travels when moving from the current position to the target parking position. That is, the movement path is a path along which the vehicle 100 moves, including forward travel, reverse travel, and steering operations. The movement path calculation unit 18 calculates and finds such a movement path. This calculation can be carried out using a known technique, and thus details thereof will be omitted here. Note that depending on the positional relationship between the current position and the target parking position, the movement path may be a path that temporarily brings the vehicle 100 outside of the parking space. The movement path calculated by the movement path calculation unit 18 is sent to the image generation unit 19, which will be mentioned later, as movement path information.

The image generation unit 19 generates a display image displayed in the monitor 21, which will be mentioned later. This display image is generated based on the peripheral image obtained by the cameras 1, the current position set by the current position setting unit 12, the movement path found by the movement path calculation unit 18, and so on. The peripheral image is sent from the periphery information obtainment unit 11 as the periphery information, the current position is sent from the current position setting unit 12 as the current position information, and the movement path is sent from the movement path calculation unit 18 as the movement path information.

The conditions in the periphery of the vehicle 100 are displayed in the monitor 21. Here, the monitor 21 corresponds to the "display unit" according to the present invention, as mentioned above. In particular, in the present embodiment, the bird's-eye view image that includes the periphery of the vehicle 100 is displayed in the monitor 21. This bird's-eye view image is generated by the image generation unit 19 based on the peripheral image obtained by the cameras 1. A vehicle image IM that schematically illustrates a top view of the vehicle 100 is displayed in the bird's-eye view image (see FIG. 3). Through this, the correction amount can be inputted by moving the vehicle image IM displayed in the monitor 21, which makes it possible to input the correction amount with ease.

In addition, it is also possible to display the vehicle image IM indicating the current position of the vehicle in the monitor 21. In other words, a bird's-eye view image including the periphery of the vehicle 100 can be displayed in the monitor 21, with the vehicle image IM expressing the current position of the vehicle indicated by a solid line in the bird's-eye view image and a vehicle image IMM based on the target parking position, as shown in FIG. 3(b), indicated by an outline, a broken line, or the like in the bird's-eye view image. Through this, and occupant can correctly understand the target parking position found based on the correction amount s/he inputted him/herself. In addition, as described above, the movement path calculated by the movement path calculation unit 18 is also displayed. The parking position adjustment device 50 according to the present embodiment is thus configured including the functional units as described above.

1-2. Processing of Parking Position Adjustment Device

Figure 4:
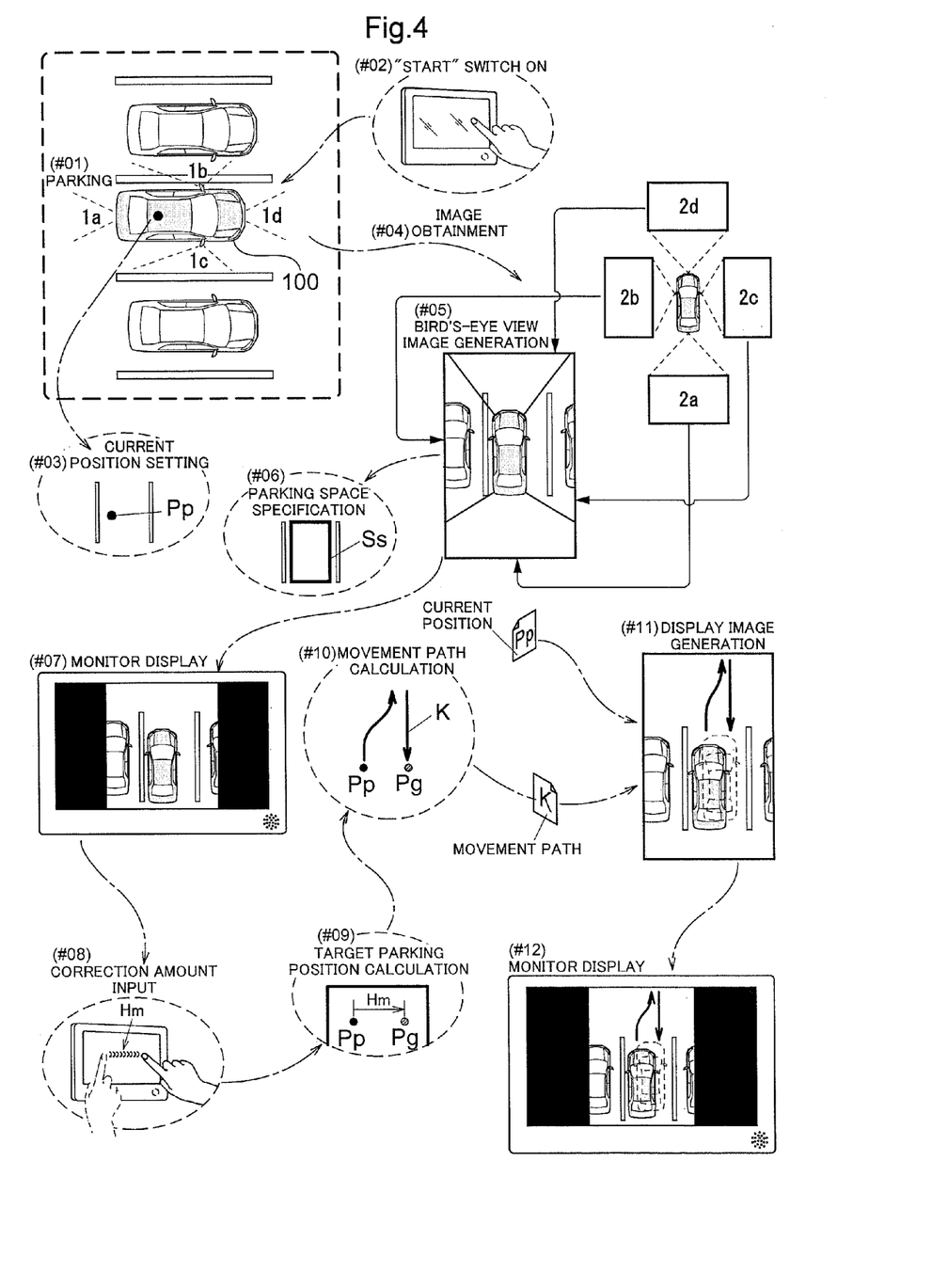
FIG. 4 is a diagram schematically illustrating a process performed when adjusting a parking position.

Next, the processes performed by the parking position adjustment device 50 will be described using the drawings. FIG. 4 is a diagram schematically illustrating a process performed when adjusting a parking position.

01 in FIG. 4 indicates a bird's-eye view of a state in which the vehicle 100 has been parked in a predetermined parking space defined by dividing lines. The operation for parking in the parking space along a movement path K as indicated in #01 in FIG. 4 may be carried out through manual steering by an occupant, by alerting the occupant of steering amounts and steering directions, or may be carried out through automatic steering using a known parking assist device. Furthermore, speed control that employs acceleration control and braking control, automatic shift position control (for example, control that automatically switches from the D range to the R range), and so on may be performed in addition to the automatic steering. In order to activate the functions of the parking position adjustment device 50, the "start" switch is pressed by an occupant (#02). In the case where the monitor 21 has a touch panel function, it is preferable for this "start" switch to be displayed in the touch panel screen. When the "start" switch is pressed, the current position setting unit 12 sets the current position of the vehicle 100 as a current position Pp (#03).

Here, as illustrated in FIG. 1, the vehicle 100 is provided with the cameras 1a through 1d on various areas of the vehicle. These cameras 1a through 1d begin to obtain the peripheral images at least when the "start" switch has been pressed (#04). The peripheral images obtained in this manner correspond to individual peripheral images 2a through 2d obtained by the respective cameras 1a through 1d. The peripheral images 2a through 2d are sent to the image generation unit 19, and a bird's-eye view image is generated (#05). This bird's-eye view image generated by the image generation unit 19 is then sent to the parking space specification unit 15. The parking space specification unit 15 specifies a parking space Ss in which the vehicle 100 is parked using the bird's-eye view image (#06). The bird's-eye view image generated by the image generation unit 19 is also sent to the monitor 21. This bird's-eye view image is then displayed in the monitor 21 (#07).

Next, an occupant operates the touch panel and inputs a correction amount Hm (#08). Here, in addition to the touch panel of the monitor 21, the method for inputting the correction amount Hm can also employ, for example, a joystick, a mouse, a pushbutton, or the like. Meanwhile, in the case of a joystick, a resistive force may be imparted, as disclosed in, for example, JP 2010-128619A. Based on the entry/exit space information set by the entry/exit space setting unit 14, the target parking position setting unit 17 determines whether or not the inputted correction amount Hm is valid. If the inputted correction amount Hm is invalid, a message reading "the correction amount is invalid" is displayed in the monitor 21 (#08). On the other hand, if the correction amount Hm is valid, the target parking position setting unit 17 calculates a target parking position Pg within the parking space Ss using the correction amount Hm and the current position Pp set by the current position setting unit 12 (#09). Then, using the current position Pp and the target parking position Pg, the movement path calculation unit 18 calculates the movement path K along which the vehicle 100 will travel when moving from the current position Pp to the target parking position Pg (#10).

The current position Pp, (the target parking position Pg), and the movement path K found as described above are combined by the image generation unit 19, and a display image is generated (#11). Then, the generated display image is displayed in the monitor 21 (#12). The occupant can then adjust the parking position appropriately within the parking space Ss in which the vehicle 100 is already parked by moving the vehicle 100 along the movement path K displayed in the monitor 21 in this manner. Alternatively, a configuration in which the parking position is adjusted by automatically moving the vehicle 100 along the movement path K can also be employed.

2. Second Embodiment

Next, a second embodiment will be described. The aforementioned first embodiment describes an occupant inputting the correction amount for the vehicle 100 him/herself. The parking position adjustment device 50 according to the present embodiment, however, differs from the parking position adjustment device 50 according to the aforementioned first embodiment in that the correction amount is automatically inputted. The rest of the configuration is the same as in the first embodiment, and thus the following descriptions will focus on this difference.

Figure 5:
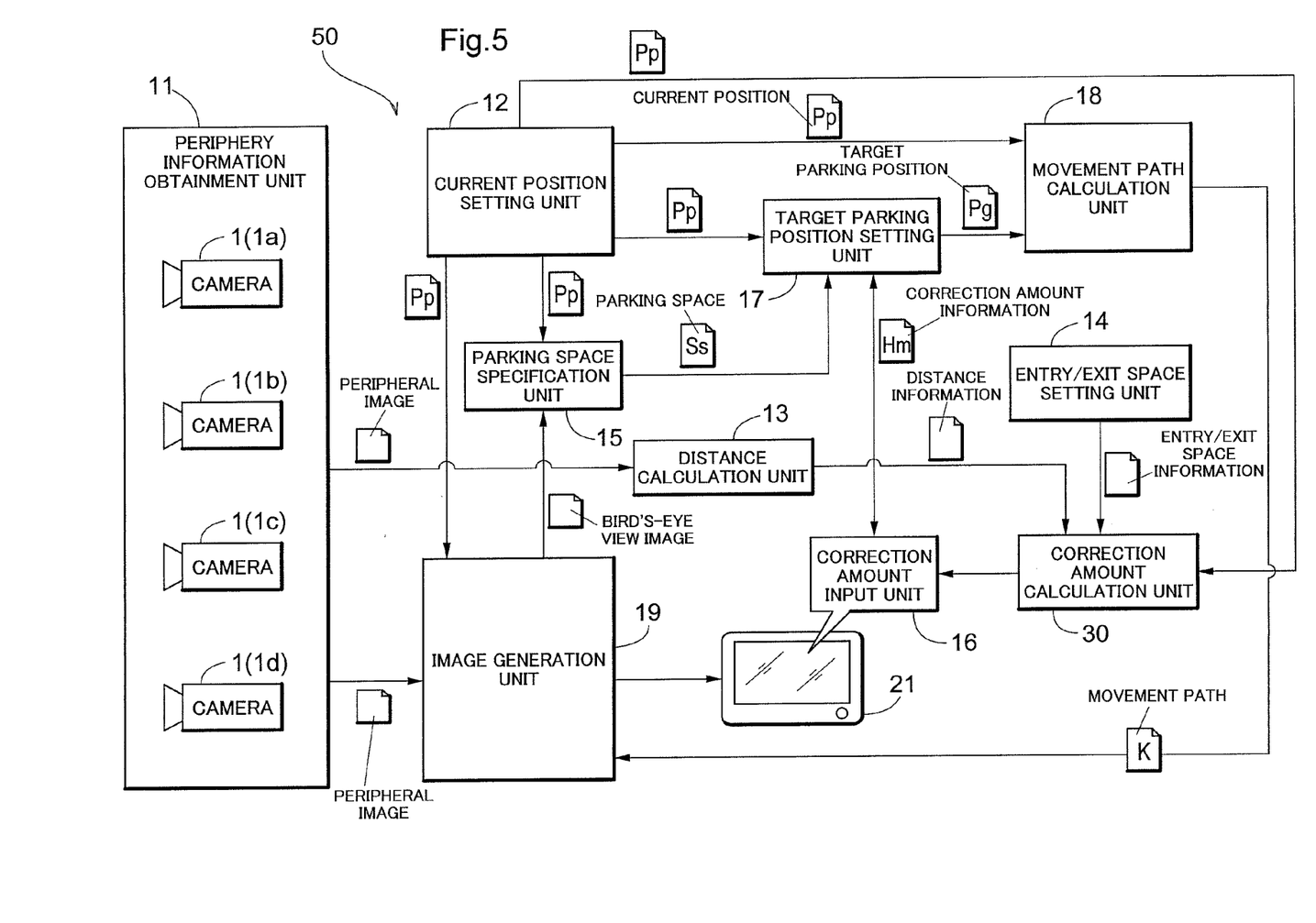
FIG. 5 is a block diagram schematically illustrating the overall configuration of a parking position adjustment device according to a second embodiment.

FIG. 5 is a block diagram schematically illustrating the configuration of the parking position adjustment device 50 according to the second embodiment. The parking position adjustment device 50 according to the present embodiment includes a correction amount calculation unit 30 in addition to the configuration described in the first embodiment and illustrated in FIG. 1. In addition, the present embodiment differs from the first embodiment in that the distance information indicating the distance between the vehicle 100 and the object present in the periphery of the vehicle 100 found by the distance calculation unit 13 and the entry/exit space information indicating the entry/exit space set by the entry/exit space setting unit 14 are sent to the correction amount calculation unit 30 instead of being sent to the correction amount input unit 16.

The correction amount calculation unit 30 calculates the correction amount based on the peripheral image and the entry/exit space of an occupant of the vehicle 100. "Based on the peripheral image" means based on the distance from the vehicle 100 to the object present in the periphery of the vehicle 100 included in the peripheral image. This distance is calculated by the distance calculation unit 13 and sent as the distance information. Meanwhile, "based on the entry/exit space" means based on the (width of the) entry/exit space. This entry/exit space is sent by the entry/exit space setting unit 14 as the entry/exit space information.

Here, in the case where an object is present in the vicinity of the vehicle 100 so that the entry/exit space cannot be secured, there will be an obstruction to an occupant entering/exiting from the vehicle. The parking position adjustment device 50 according to the present embodiment automatically calculates a movement amount for moving the position of the vehicle 100 to a position where an occupant can smoothly enter/exit from the vehicle. This movement amount corresponds to the correction amount calculated by the correction amount calculation unit 30. Specifically, in the case where the distance between the vehicle 100 and an object is 30 cm and the (width of the) entry/exit space is 70 cm, the correction amount calculation unit 30 takes the distance between the two, or 40 cm, as the correction amount. Through this, a sufficient entry/exit space can be secured for the occupant, which enables the occupant to smoothly enter/exit from the vehicle. The correction amount found by the correction amount calculation unit 30 is sent to the correction amount input unit 16 as the correction amount information.

The correction amount is inputted into the correction amount input unit 16. The correction amount is sent from the correction amount calculation unit 30 as the correction amount information, as described above. Accordingly, in the present embodiment, the input of the correction amount into the correction amount input unit 16 is carried out automatically, rather than by an occupant. This avoids burdening the user with operations. The correction amount inputted by the correction amount input unit 16 is sent to the target parking position setting unit 17 and is used in the calculation of the target parking position. Thereafter, the processes performed up until the movement path is calculated are the same as in the aforementioned first embodiment, and thus descriptions thereof will be omitted. Therefore, according to the parking position adjustment device 50 of the present embodiment, the correction amount can be inputted automatically, and the movement path can be found.

3. Other Embodiments

The aforementioned embodiments describe finding the distance between the vehicle 100 and an object by analyzing the peripheral image obtained by the cameras 1 capturing an object in the periphery of the vehicle 100. However, the scope to which the present invention can be applied is not intended to be limited thereto. For example, it is of course possible to employ a configuration in which the vehicle 100 is provided with sonar that detects an object in the periphery of the vehicle 100 and the distance to the object is found based on a sonar detection result. According to such a configuration, it is possible to realize a configuration in which the target parking position setting unit 17 sets the allowable input range for the correction amount based on the distance from the vehicle 100 to the object detected by sonar. Note that laser radar, millimeter wave radar, and so on can also be used instead of sonar.

Figure 6:
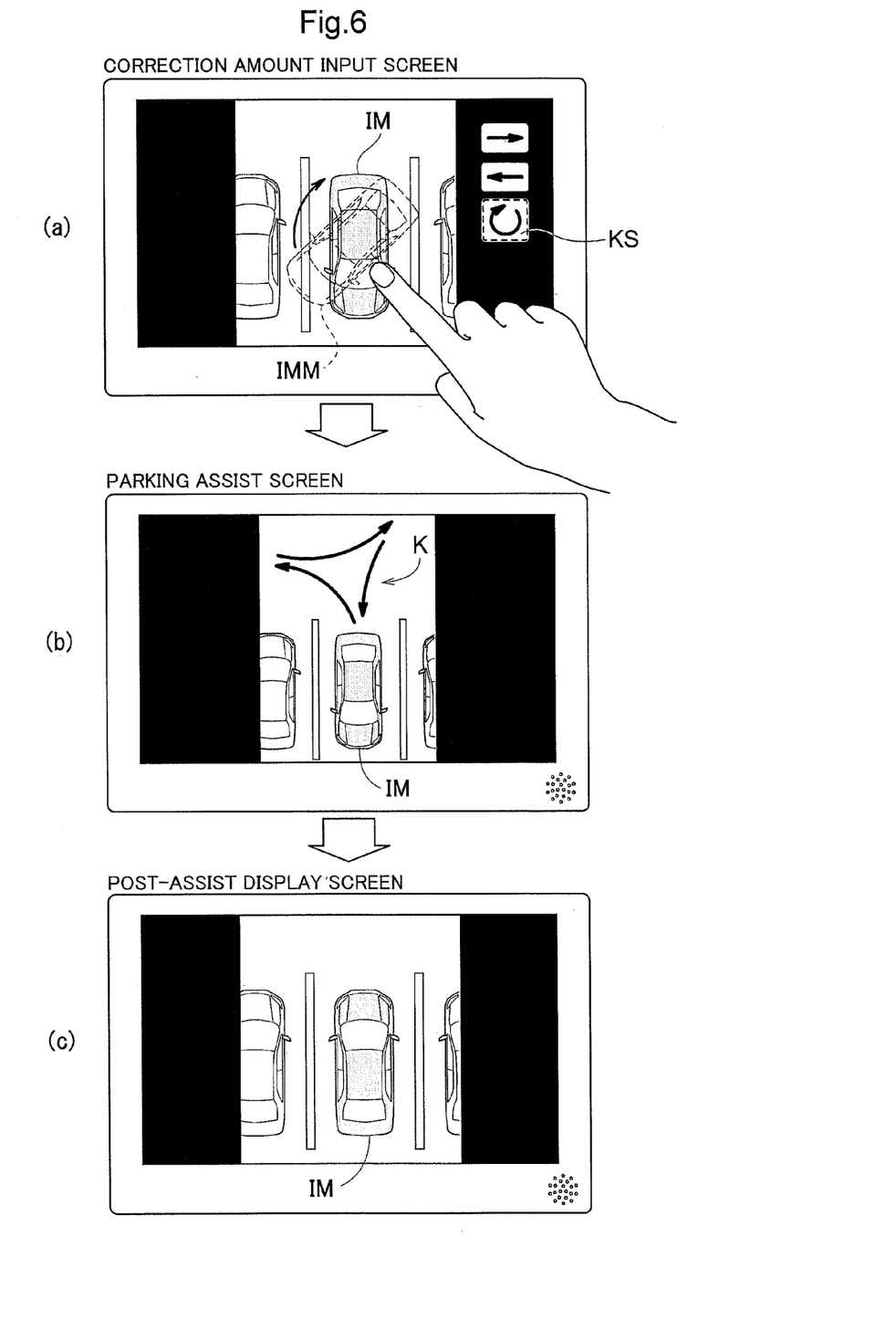
FIG. 6 is a diagram illustrating an example when a vehicle has been parked moving forward.

The aforementioned embodiments describe a position in a parking space into which the vehicle 100 has backed as the current position. However, the scope to which the present invention can be applied is not intended to be limited thereto. As shown in FIG. 6, it is also possible to take a position in a parking space into which the vehicle 100 has advanced forward as the current position. In this case, it is possible to input the correction amount (rotation amount) by pressing a "rotate" switch KS, as shown in FIG. 6(*a*), change directions after first backing out of the parking space, and then once again backing into the parking space (see FIG. 6(*b*)). As a result, the vehicle 100 can be backed into the parking space and parked, as shown in FIG. 6(*c*). This is useful in the case where a following vehicle has approached the vehicle 100 from the rear and the driver of the vehicle 100 wishes to temporarily park in the parking space and then re-park the vehicle after.

Figure 7:
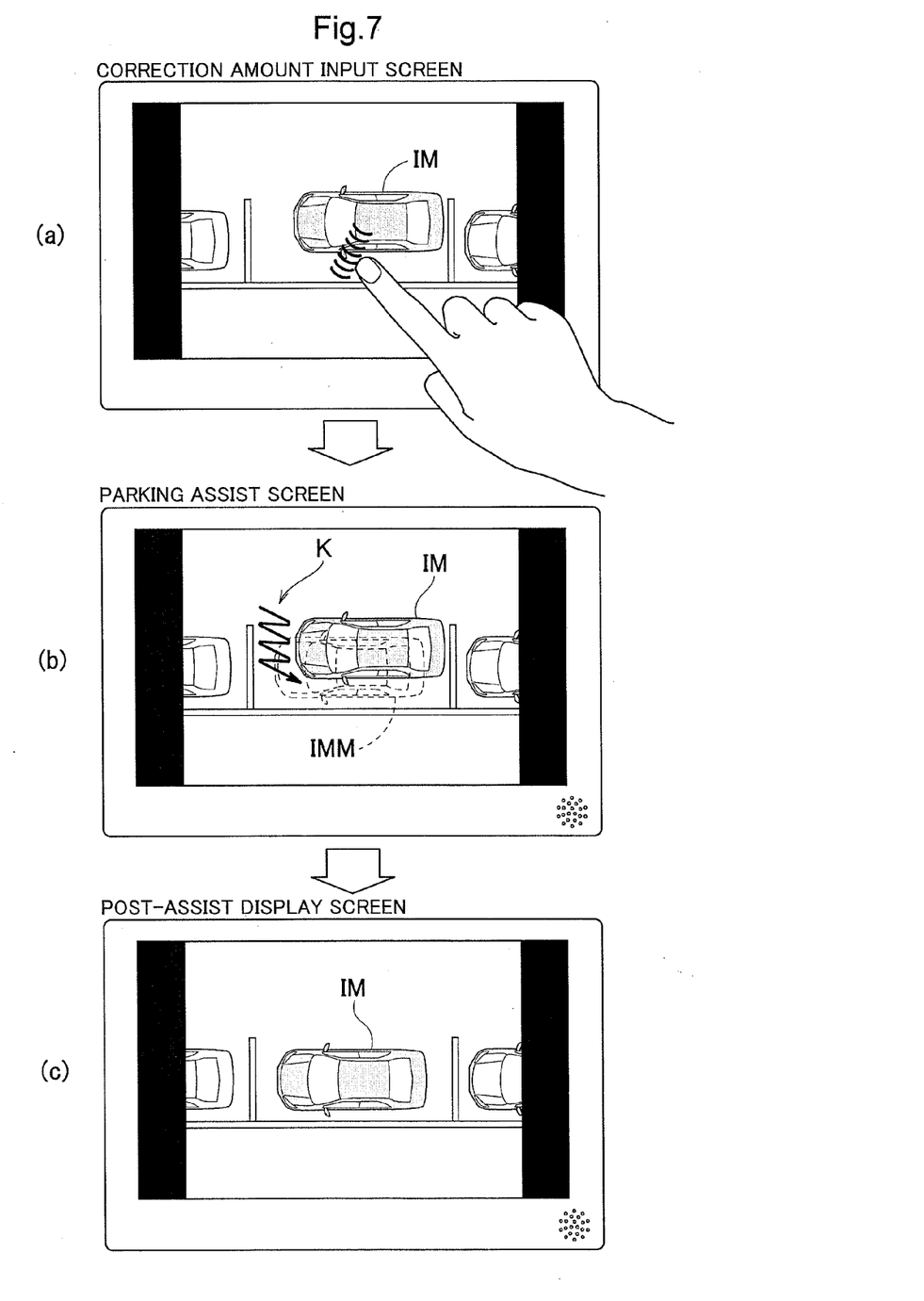
FIG. 7 is a diagram illustrating an example when a vehicle has been parallel-parked.

It is also possible to use the parking position adjustment device 50 to adjust the parking position when parallel-parking a vehicle, as shown in FIG. 7. In this case, the correction amount can be inputted as shown in FIG. 7(*a*), and the parallel parking can be performed properly (see FIG. 7(*c*)) by steering back and forth in small increments, as shown in FIG. 7(*b*). This is useful in the case where the driver has attempted to parallel park but has been unable to completely enter the parking space, and wishes to properly park in that parking space.

The aforementioned embodiments describe the target parking position setting unit 17 as setting an allowable range for correction amount input based on distances from the vehicle 100 to objects included in the peripheral image. However, the scope to which the present invention can be applied is not intended to be limited thereto. In other words, is also possible to employ a configuration in which an allowable input range for the correction amount is not set regardless of the distance from the vehicle 100 to the object included in the peripheral image.

The aforementioned embodiments describe the conditions in the periphery of the vehicle 100 being displayed in the monitor 21. However, the scope to which the present invention can be applied is not intended to be limited thereto. It is of course also possible to employ a configuration in which the conditions in the periphery of the vehicle 100 are not displayed.

The aforementioned embodiments describe a bird's-eye view image including the periphery of the vehicle 100 being displayed in the monitor 21. However, the scope to which the present invention can be applied is not intended to be limited thereto. It is also possible to display the images captured by the cameras 1 as-is, and possible to display the vehicle image IM viewed at an angle from the vehicle 100, instead of the bird's-eye view image. Furthermore, it is possible to display no images of the periphery of the vehicle 100.

The aforementioned embodiments describe displaying the target parking position as an outline in the monitor 21 in accordance with the input of the correction amount. However, the scope to which the present invention can be applied is not intended to be limited thereto. It is also possible to display the target parking position using a different color than the current position, rather than displaying an outline. It is also possible to employ a configuration in which the target parking position is not displayed.

The aforementioned embodiments describe the conditions in the periphery of the vehicle 100 being displayed based on images captured by the cameras 1. However, the scope to which the present invention can be applied is not intended to be limited thereto. For example, it is of course also possible to employ a configuration in which the vehicle 100 is provided with sonar and the conditions in the periphery of the vehicle 100 are displayed as graphics based on a sonar detection result.

The aforementioned embodiments describe inputting the correction amount by moving the vehicle image IM displayed in the monitor 21. However, the scope to which the present invention can be applied is not intended to be limited thereto. For example, the configuration may be such that a numerical value is inputted directly. In this case, the configuration can of course be such that the correction amount is inputted using a numerical keypad, or left and right correction amounts are inputted by pressing two left and right arrow keys.

The aforementioned embodiments mention that it is preferable to include parameters defining rotation in the current position, the target parking position, and so on. However, the scope to which the present invention can be applied is not intended to be limited thereto. For example, it is also possible to take a position that has been corrected in a direction parallel to the frame defining the parking space specified by the parking space specification unit 15 as the current position, the target parking position, or the like. Defining the current position, the target parking position, or the like as a position corrected in the parallel direction makes it unnecessary to take rotation into consideration particularly in the case where the position is highly parallel to the side area of the vehicle that defines the parking space (in other words, the case where the angle at which a side line that partially defines the current position, the target parking position, or the like and a frame adjacent to the side area of the vehicle intersect is within several degrees), which makes it possible to lighten the computational burden involved in calculating the movement path.

The aforementioned second embodiment describes the correction amount as being automatically inputted based on the entry/exit space information. However, the scope to which the present invention can be applied is not intended to be limited thereto. For example, is also possible for the correction amount calculation unit 30 to set the correction amount so that the position of the vehicle 100 is adjusted to the center of the parking space specified by the parking space specification unit 15. Even in this case, the correction amount is inputted and the target parking position is set automatically, which makes it possible to properly calculate the movement path of the vehicle 100.

It is also possible to configure the parking position adjustment device 50 so as to include the correction amount input unit 16 that inputs a correction amount for correcting the current position of the vehicle 100 within a parking space that includes the current position in which the vehicle 100 is parked; the target parking position setting unit 17 that calculates and sets the target parking position within the parking space based on the current position and the correction amount; and the movement path calculation unit 18 that calculates the movement path of the vehicle 100 from the current position to the target parking position.

According to this configuration, the movement path from the current position to the target parking position can be calculated with the ease in accordance with the inputted correction amount. Accordingly, an occupant of the vehicle 100 may simply move the vehicle 100 along the movement path that has been calculated and found, which makes it possible to easily adjust the parking position of the host vehicle within a parking space in which the vehicle has already been parked.

INDUSTRIAL APPLICABILITY

The present invention can be applied in parking position adjustment devices that adjust the position of a vehicle that has already been parked in a parking space.

DESCRIPTION OF REFERENCE SIGNS

1: camera
11: periphery information obtainment unit
12: current position setting unit
15: parking space specification unit
16: correction amount input unit
17: target parking position setting unit
18: movement path calculation unit
21: monitor (display unit)
30: correction amount calculation unit
50: parking position adjustment device
100: vehicle
Hm: correction amount
K: movement path
Pg: target parking position
Pp: current position
Ss: parking space

The invention claimed is:

1. A parking position adjustment device comprising:
a current position setting unit that sets the position in which a vehicle is already parked as a current position;
a parking space specification unit that specifies a parking space, in which the vehicle is parked, that includes the current position;
a target parking position setting unit that sets, within the parking space, a target parking position to which the vehicle is to be moved from the current position;
a movement path calculation unit that calculates a movement path of the vehicle from the current position to the target parking position; and
a display unit that displays conditions in the periphery of the vehicle,
wherein the target parking position setting unit is configured so as to input a correction amount from the current position of the vehicle to the target parking position by moving a vehicle image displayed in the display unit.

2. The parking position adjustment device according to claim 1,
wherein the display unit displays a bird's-eye view image including the periphery of the vehicle.

3. The parking position adjustment device according to claim 1,
wherein a vehicle image indicating the current position is also displayed in the display unit.

4. The parking position adjustment device according to claim 1, further comprising:
sonar that detects an object in the periphery of the vehicle,
wherein the target parking position setting unit sets an allowable input range for the correction amount based on the distance from the vehicle to an object detected by the sonar.

5. The parking position adjustment device according to claim 1, further comprising:
a camera that obtains a peripheral image by capturing an image of conditions in the periphery of the vehicle,
wherein the target parking position setting unit sets an allowable input range for the correction amount based on the distance from the vehicle to an object included in the peripheral image.

6. The parking position adjustment device according to claim 4,
wherein the object is a vehicle parked in the periphery of the vehicle.

7. The parking position adjustment device according to claim 5,
wherein the object is a dividing line that defines the parking space.

8. The parking position adjustment device according to claim 1,
wherein the target parking position setting unit sets an allowable input range for the correction amount based on the distance from the vehicle to the object and an entry/exit space for an occupant of the vehicle.

9. The parking position adjustment device according to claim 1, further comprising:
a periphery information obtainment unit that obtains periphery information indicating conditions in the periphery of the vehicle; and
a correction amount calculation unit that calculates the correction amount based on the periphery information and an entry/exit space for an occupant of the vehicle.

10. The parking position adjustment device according to claim 1,
wherein parameters defining rotation are included in parameters that define the current position and the target parking position.

11. The parking position adjustment device according to claim 1,
wherein the movement path is a path along which the vehicle moves, including forward travel, reverse travel, and steering operations.

* * * * *